United States Patent [19]

Andruchiw et al.

[11] Patent Number: 4,539,064

[45] Date of Patent: Sep. 3, 1985

[54] APPARATUS FOR SPLICING STRIPS OF THERMOPLASTIC MATERIAL

[76] Inventors: Roman Andruchiw, 137 Spring Garden Ave., Willowdale, Ontario, Canada, M2N 3G6; David C. Cordingley, 3 Clearside Pl., Eiobicoke, Ontario, Canada, M9C 2G5; Mark T. Loughborough, 79 Isle of Venice, Fort Lauderdale, Fla. 33301

[21] Appl. No.: 597,193

[22] Filed: Apr. 6, 1984

Related U.S. Application Data

[63] Continuation of Ser. No. 314,377, Oct. 23, 1981, abandoned.

[30] Foreign Application Priority Data

Oct. 24, 1980 [CA] Canada .................................. 363235

[51] Int. Cl.³ ............................................ B32B 19/02
[52] U.S. Cl. .................................. 156/379.7; 156/71; 156/153; 156/159; 156/257; 156/273.9; 156/304.5; 156/304.6; 156/309.6; 156/511; 156/502; 156/523; 156/535; 156/556
[58] Field of Search ................. 156/153, 157, 71, 159, 156/304.5, 304.6, 273.9, 309.6, 309.7, 257, 510, 511, 535, 536, 556, 502, 523, 379.7; 144/134 D

[56] References Cited

U.S. PATENT DOCUMENTS

| | | | |
|---|---|---|---|
| 2,309,305 | 1/1943 | Dahlstrom et al. | 156/304.5 |
| 2,379,500 | 7/1945 | Stefans | 156/304.6 |
| 3,061,503 | 10/1962 | Gould et al. | 156/309.9 |
| 3,418,883 | 12/1968 | Leibow | 144/134 |
| 3,507,735 | 4/1970 | Chisholm | 156/379.7 |
| 3,517,712 | 6/1970 | Selowitz | 144/134 D |
| 3,553,048 | 1/1971 | Ryan | 156/257 |
| 3,589,959 | 6/1971 | Sanders | 156/159 |
| 3,733,231 | 5/1973 | Rutkowski et al. | 156/71 |
| 3,846,204 | 11/1974 | Eisler | 156/273.9 |
| 3,853,655 | 12/1974 | Pecha | 156/159 |
| 4,061,517 | 12/1977 | Dutton et al. | 156/304.6 |
| 4,240,855 | 12/1980 | Pennington | 156/304.6 |
| 4,248,280 | 2/1981 | Taylor | 156/304.5 |
| 4,284,464 | 8/1981 | Forster | 156/535 |

FOREIGN PATENT DOCUMENTS

| | | |
|---|---|---|
| 1737584 | 1/1957 | Fed. Rep. of Germany . |
| 40126 | 7/1970 | Fed. Rep. of Germany . |
| 312270 | 12/1973 | Fed. Rep. of Germany . |
| 2248678 | 4/1974 | Fed. Rep. of Germany . |
| 2182587 | 12/1973 | France . |
| 501885 | 2/1976 | U.S.S.R. ........................... 156/304.6 |

Primary Examiner—Jerome Massie
Attorney, Agent, or Firm—James T. Wilbur

[57] ABSTRACT

In a method of splicing strips of thermoplastic material to form waterstop joints, the strips are first clamped in longitudinal alignment with their adjacent ends spaced apart. While the strips are so clamped, a routing tool is used to cut complementary rebates at these adjacent ends, after which the strips are moved into end abutting relationship while the longitudinal alignment of the strips is maintained, the rebated ends being brought into a half-lap configuration. The cooperating ends are then welded together by means of an electric heating element which was inserted between the ends prior to their being clamped together.

2 Claims, 6 Drawing Figures

U.S. Patent  Sep. 3, 1985  Sheet 1 of 2  4,539,064
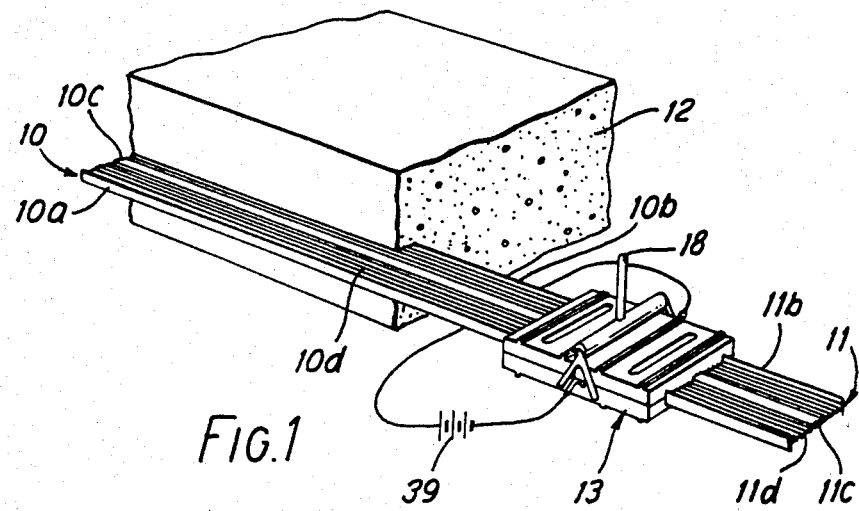
FIG.1
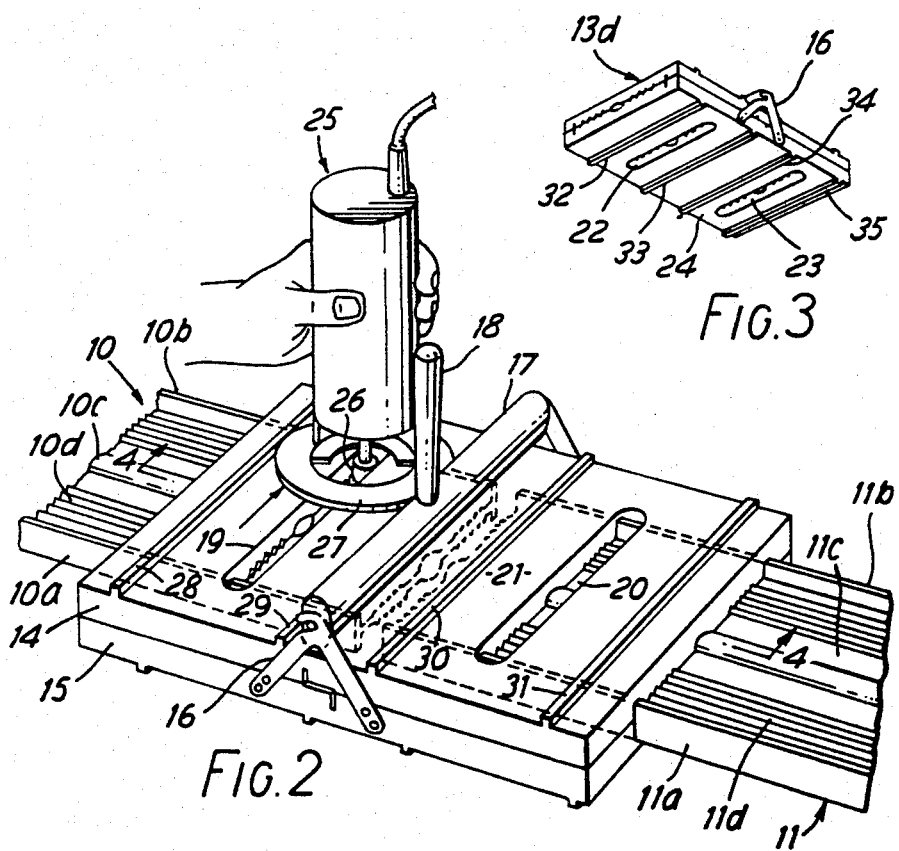
FIG.2
FIG.3

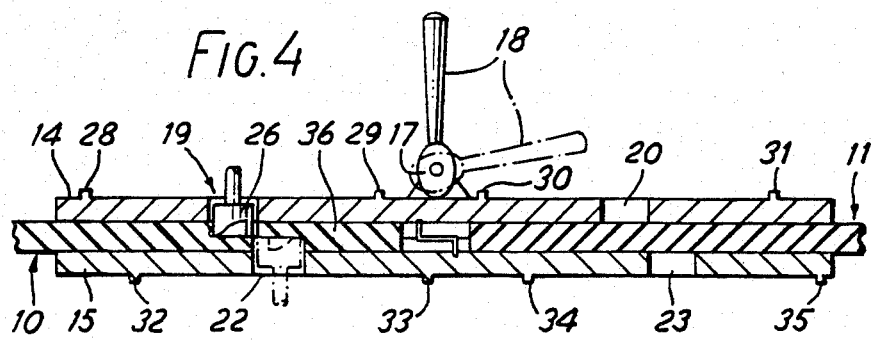
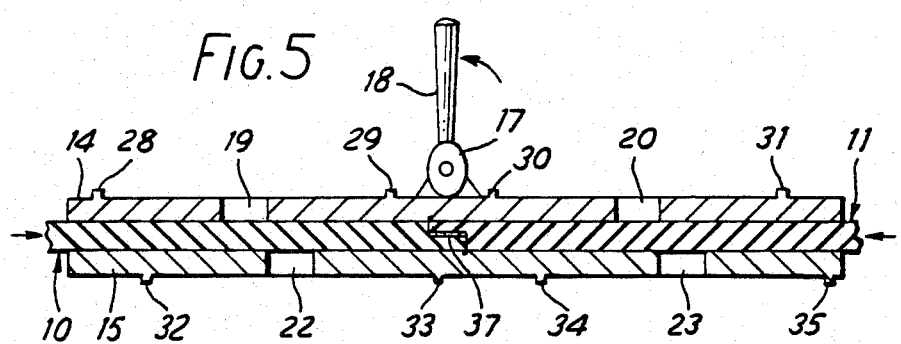
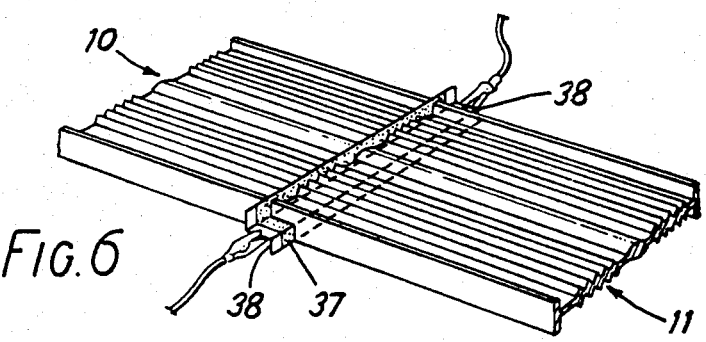

APPARATUS FOR SPLICING STRIPS OF THERMOPLASTIC MATERIAL

This application is a continuation, of application Ser. No. 314,377, filed 10/23/81, now abandoned.

This invention relates to a method of, and apparatus for use in, splicing strips of thermoplastic material, the strips being of like cross section at least at the ends to be spliced.

One important application of the invention is to the splicing of waterstops in the construction of concrete hydraulic structures, such as dams, wherein it is necessary to avoid irregularities at the waterstop joints which would allow seepage of water. Seepage of water around the periphery of an embedded waterstop, typically at an imperfect joint, gives rise to the danger of leakage into an area where the integrity of the finished structure under hydraulic load might be impaired.

Waterstops used in concrete hydraulic structures are made from lengths of thermoplastic material, such as polyvinyl chloride, of uniform cross section which have to be spliced to one another, and to matching junction pieces. The ends of the pieces to be spliced are usually welded together. In practice is is difficult to ensure a satisfactory joint because the ends to be welded must be accurately matched and maintained in position during the welding operation under the difficult conditions normally experienced on a construction site.

It is an object of the present invention to provide an improved method of splicing the matching ends of thermoplastic strips, such as waterstops, which ensures accurate alignment of the strips during the welding operation.

In the method according to the present invention, the strips are first clamped in longitudinal alignment with their adjacent ends spaced apart, and the ends are trimmed by routing complementary rebates at the respective ends. While maintaining the longitudinal alignment of the strips, the strips are moved into end abutting relationship to provide a half-lap configuration and clamped together while maintaining the configuration. The rebated ends of the strips are then welded together while so clamped. Preferably, the welding is accomplished by means of a heating element consisting of a flexible metallic mesh, which is inserted between the ends prior to their being butted together, electric current being passed through the heating element.

The invention also provides an apparatus for this purpose consisting essentially of a jig and a routing tool. The jig consists of a pair of complementary upper and lower clamping members providing opposed complementary clamping faces conforming to the cross-sectional configuration of the strips, and means for releasably securing said members in clamped relationship. The upper clamping member provides a first pair of parallel transverse slots each defining a step, and the lower clamping member provides a second pair of parallel transverse slots each defining a step, the second pair of slots being offset from the first pair by a distance less than their width. The routing tool has a cutter which can be inserted through the slots so as to engage the strips through the slots for routing transverse grooves therein, the tool having also a stop member which is engageable with the steps during routing for limiting the depths of the grooves to one half the thickness of the strips.

An exemplary embodiment of the invention will now be described by way of example with reference to the accompanying drawings, in which:

FIG. 1 illustrates a pair of waterstop strips which are clamped in longitudinal alignment by means of a jig, the ends of the strips having been trimmed and ready to be welded;

FIG. 2 illustrates the routing operation employing the routing tool in combination with the jig;

FIG. 3 illustrates the underside of the jig;

FIG. 4 is a cross section on line 4—4 in FIG. 2;

FIG. 5 is a view corresponding to FIG. 4 but with the strips moved into end abutting relationship; and FIG. 6 illustrates the configuration immediately prior to welding, the jig being omitted from this view for clarity.

The waterstop strips to be spliced are of polyvinyl chloride and are of like uniform cross-sectional shape and area. As illustrated in the drawings, each of the strips 10, 11 is formed with a pair of uptstanding edge flanges 10a, 10b and 11a, 11b, a centre bulb 10c, 11c, and longitudinally extending serrations 10d, 11d on both sides. This cross-sectional configuration is fairly standard, but presents problems when the strips have to be spliced. FIG. 1 shows the strip 10 partially embedded in a concrete wall 12 in the process of being spliced to the other strip 11. Before this can be accomplished it is necessary to trim the ends of the strips so that they can be accurately matched. This is accomplished by first clamping the strips in longitudinal alignment with their ends spaced apart, by means of a jig 13. The jig comprises a pair of complementary clamping members, namely an upper member 14 and a lower member 15, and a clamping mechanism 16 incorporating an eccentric shaft 17 operated manually by a lever 18 for releasably securing the members 14, 15 in clamped relationship. The opposed clamping faces of the clamping members 14, 15 are formed with longitudinally extending grooves which match the serrated surfaces of the strips to be joined, the clamping faces thus complementing one another so that, when clamped together, they define a cavity conforming to the cross-sectional configuration of the strips.

The upper clamping member 14 provides a pair of parallel transverse slots 19, 20, the slots being of uniform width and extending to the full width of the strips to be joined. The external surface 21 of the member 14 is flat, defining a peripheral step to each of the slots 19, 20. The lower clamping member 15 similarly provides a pair of parallel transverse slots 22, 23, and a flat external surface 24 which defines a peripheral step to each of these slots. The slots 22 and 23 are exactly similar to the slots 19 and 20, except that they are offset from the latter in the longitudinal direction of the strips 10, 11 by a distance slightly less than their width. This offset is best observed in FIGS. 4 and 5. A routing tool 25 is used to trim the ends of the strips. This tool is of a conventional type having a rotary cutter 26 and a stop 27 in the form of an annulus. As best shown in FIG. 2, a groove is routed into one of the strips by inserting the cutter 26 of the tool 25 through one of the slots, in this case the slot 19, so that the cutter engages the strip. The depth of the groove is limited by the stop member 27, which bears against the step defined by the flat surface 21. In this example the stop member is so positioned so as to limit the depth of the routed groove to one half the thickness of the strip 10. To ensure that the cutter is guided transversely in a straight line, the surface 21 of the clamping member 14 is formed with two pairs of appropriately positioned transverse straight edges 28, 29 and 30, 31 between which the stop member 27 is confined as the tool 25 is traversed along the slots. The lower clamping member is similarly formed with pairs of transverse straight edges 32, 33 and 34, 35 for this purpose.

Referring to FIG. 4, the end of the strip 10 has been trimmed by routing grooves across opposite sides of the strip, the relative positions of the grooves being determined by the offset, slightly overlapping slots 19, 20 so that a rebate is formed at one end of the strip. The strip 11 is similarly trimmed to form a complementary rebate at its end. After this the jig 13 is opened by releasing the clamping mechanism 16 and the waste material 36 trimmed from the ends is removed. At this point an electric resistance heating element 37 is inserted between the adjacent ends of the strips 10, 11 and the strips are moved into end abutting relationship forming a half-lap configuration with the heating element 37 sandwiched between the rebated ends as illustrated in FIGS. 5 and 6. The profiled clamping faces of the clamping members 14, 15, which conform to the cross-sectional configuration of the strips, serve as guides by which the strips can be so moved without loss of longitudinal alignment. The clamping members 14 and 14 are again secured in clamped relationship where, as illustrated in FIG. 5, the opposed clamping faces of the clamping members 14, 15 are in substantially continuous contact with the area of the sides of strips 10, 11 at and adjacent to their abutting ends. The heating element 37 covers the whole of the interface between the strips, the ends of the heating element providing terminals 38 extending from the sides of the jig for connection to a current source 39 (FIG. 1). The ends to be welded together are thus securely held in position while electric current is passed through the heating element to soften the thermoplastic material and effect a weld. When the welded joint is made, it is allowed to cool and the jig is removed leaving the accurately spliced joint.

In the present example the heating element is a flexible metallic mesh, preferably of fine aluminum wires, the openings being diamond-shaped and oriented as shown in FIG. 6. The reason for this is that the heating element remains embedded in the joint and must be capable of accommodating movements due to mechanical strain or thermal change. However, it it to be understood that other heating means may be employed to effect the heating step. For example, one may use an electric resistance heating element consisting of a fillet of polyvinyl chloride incorporating a conductive phase such as graphite. Alternatively one may employ dielectric heating at the joint. Yet another example of heating means would be a suitable chemical reagent capable of being ignited to generate the required heat.

We claim:

1. Apparatus for use in the splicing of the ends of a pair of elongated strips of thermoplastic material, said strips having a like uniform cross-section and being formed with longitudinally extending serrations on opposite sides thereof comprising:

trimming means for forming complementary surfaces at said ends such that when said ends are caused to move into an abutting relationship, substantially the entire said surfaces thereof are in contact with each other and the serrations of one of said strips are in longitudinal alignment with the serrations of the other said strip during the splicing operation;

means for softening the thermoplastic material at the abutting ends thereof so as to weld said ends together, said means for softening being electronic, conducting mesh means positioned between the end faces of said elongated strips through which electronic current is passed in order to heat and thereby soften the thermoplastic material at the abutting ends, said mesh means remaining embedded in said joined ends; and a pair of complementary upper and lower clamping members providing opposed complementary clamping faces conforming to the configuration of the configuration of the sides of said strips and having means for releasably securing said clamping members in clamped relationship in order to maintain said ends in abutting relationship therebetween, said clamping faces being in substantially continuous contact with the area of the sides of the strips at and adjacent to said abutting ends in order to constrain the softened thermoplastic material between said abutting ends such that the abutting ends have substantially the same configuration as the sides of said strips adjacent thereto said upper claming member having a first pair of parallel transverse slots, each of which define a step, said lower clamping member having a second pair of parallel transverse slots, each of which define a step, said second pair of slots being offset from the first pair of slots by a distance less than their width, said trimming means comprisng a routing tool having a cutter which is engageable with said strips through the slots for routing tranverse grooves therein, said routing tool having a stop member engageable with said steps for limiting the grooves to one-half the thickness of the strips.

2. Apparatus for use in the splicing of the ends of a pair of elongated strips of thermoplastic material, said strips having a like uniform cross-section and being formed with longitudinally extending serrations on opposite sides thereof comprising:

trimming means for forming complementary surfaces at said ends such that when said ends are caused to move into an abutting relationship, substantially the entire said surfaces thereof are in contact with each other and the serrations of one of said strips are in longitudinal alignment with the serrations of the other said strip;

means for softening the thermoplastic material at the abutting ends thereof so as to weld said ends together; and a pair of complementary upper and lower clamping members providing opposed complementary clamping faces conforming to the configuration of the configuration of the sides of said strips and having means for releasably securing said clamping members in clamped relationship in order to maintain said ends in abutting relationship therebetween, said clamping faces being in substantially continuous contact with the area of the sides of the strips at and adjacent to said abutting ends in order to constrain the softened thermoplastic material between said abutting ends such that the abutting ends have substantially the same configuration as the sides of said strips adjacent thereto, said upper clamping member having a first pair of parallel transverse slots, each of which define a step, said lower clamping member having a second pair of parallel transverse slots, each of which define a step, said second pair of slots being offset from the first pair of slots by a distance less than their width, said trimming means comprising a rotating tool having a cutter which is engageable with said strips through the slots for routing transverse grooves therein, said routing tool having a stop member engageable with said steps for limiting the grooves to one-half the thickness of the strips.

* * * * *